UNITED STATES PATENT OFFICE.

WILLIAM G. F. SIEGMANN, OF BALTIMORE, MARYLAND, ASSIGNOR TO MARY V. GAULT, OF BALTIMORE, MARYLAND.

MAGNESIUM CEMENT.

1,212,575.   Specification of Letters Patent.   Patented Jan. 16, 1917.

No Drawing.   Application filed May 10, 1916. Serial No. 96,619.

*To all whom it may concern:*

Be it known that I, WILLIAM G. F. SIEGMANN, a subject of the Emperor of Germany, and resident of Baltimore, in the State of Maryland, United States of America, have invented certain new and useful Improvements in Magnesium Cement, of which the following is a specification.

This invention relates to the production of a magnesium cement composition designed for use as building materials including substitutes for woodwork, flooring, trimmings, insulations and a variety of other uses in connection with such buildings, whereas it is furthermore adapted for the production of side-walks and in fact wherever a stonelike substance of modified qualities may be installed or employed.

This invention is an improvement on the invention set forth in Letters Patent numbered 1,102,358, issued to me July 7, 1914 in that the product resulting from the composition of matter to be claimed herein has qualities which are not inherent in the product resulting from the process set forth in the said patent, the particular characteristic of the product of the present invention being that it is fibrous without being hygroscopic in character, by which result it is possible to penetrate the material with nails, screws or other securing devices without causing a fracture or disintegration of the said material, and said product will not warp.

With the foregoing and other objects in view, the invention consists in the process of making magnesium cement, the same to be hereinafter more fully set forth and claimed.

In carrying out my invention, I form a dry powder produced by a mixture of magnesium oxid or equivalent oxid, magnesium sulfate, colophonium, common salt, kieselguhr, carbonate of barium and vegetable or other fiber, from such vegetation as straw, cork, sea grass or the like, to be hereinafter referred to under the comprehensive term "fiber". The composition may be employed with sufficient water and carbon bi-sulfid to produce a plastic composition to be molded in any desired shape or to be spread as a coating for walls or other parts of a building.

The purposes of the ingredients, except the carbonate of barium, have been stated in the former patent and the result growing out of the introduction of carbonate of barium and other added ingredients has been set forth herein. It will be noted in this connection that while it has been specified that oxid of magnesium is used, it is not the purpose of the inventor to be limited thereto, as oxid of zinc, oxid of calcium, oxid of alumina and other equivalent oxids may be substituted for the oxid of magnesium as the invention contemplates any admixture in which the gradual production of oxy-chlorid of magnesium is accomplished.

If it is desired to modify the hardening of the composition by retarding the formation of the chlorid, I may add calcined gypsum, boric acid, powdered borax or other equivalent ingredient and asbestos may be employed in connection with the vegetable fiber as a filler for varying the density of the mass, or colophonium if used as a filler in combination with the kieselguhr with or without the asbestos, produces material which may be worked or shaped for various uses and obviously a coloring matter may be introduced to give the desired shade.

In addition to making the material in the manner stated herein, I may produce an article of commerce consisting of a composition of matter in the form of a powder, which may be shipped and handled in such form and afterward mixed with the water and carbon bi-sulfid or both to form the plastic material adapted for building material, pavements and inside and outside trimmings or the ingredients may be combined and molded into any desired shape, as heretofore stated.

While I have, in a general way, stated the ingredients and the process of carrying out the invention, I have found that the best results are attained by combining the ingredients in the proportions substantially as follows, viz: magnesium oxid, 40 parts;

carbonate of barium, 3 parts; magnesium sulfate, 10 parts; colophonium, 2 parts; kieselguhr, 10 parts; salt, 5 parts; fibrous material, 30 parts, and water and carbon bi-sulfid sufficient to render the composition plastic, although these proportions may be modified to suit particular requirements.

I claim—

The herein described magnesium cement consisting of magnesium oxid, colophonium, magnesium sulfate, salt, kieselguhr, carbonate of barium, fiber, carbon bi-sulfid and water.

WILLIAM G. F. SIEGMANN.